(12) United States Patent
Susnjara

(10) Patent No.: US 6,484,783 B1
(45) Date of Patent: Nov. 26, 2002

(54) WORKPIECE HOLDING APPARATUS AND METHOD THEREOF

(75) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 09/576,745

(22) Filed: May 23, 2000

(51) Int. Cl.[7] ............................................... B32B 31/00
(52) U.S. Cl. ........................ 156/580; 156/382; 156/581
(58) Field of Search ............................... 156/285, 381, 156/382, 580, 581

(56) References Cited

U.S. PATENT DOCUMENTS

| | | |
|---|---|---|
| 2,458,302 A | 1/1949 | Richardson |
| 2,855,653 A | 10/1958 | Kastenbein |
| 3,174,188 A | 3/1965 | Wood |
| 4,561,642 A | 12/1985 | Parque |
| 5,135,206 A | 8/1992 | Martinez |
| 5,167,698 A | 12/1992 | Guilmette |
| 5,894,705 A | 4/1999 | Sutton |
| 6,113,693 A | * 9/2000 | Thompson .................. 118/500 |

* cited by examiner

Primary Examiner—James Sells
(74) Attorney, Agent, or Firm—Stevens, Davis, Miller & Mosher, LLP

(57) ABSTRACT

The present invention is a workpiece holding device. The device should be shaped in a configuration tailored to the workpieces that are to be held together or dispersed. The device should have a flow channel that would transmit hydraulic force being applied to the device so as to either retain or disperse workpieces adjacent to the device.

28 Claims, 7 Drawing Sheets

WORKPIECE HOLDING APPARATUS AND METHOD THEREOF

FIELD OF THE INVENTION

The present invention discloses a vacuum operated clamping mechanism, useful for securing panels in perpendicular alignment to facilitate assembly of the same.

BACKGROUND OF THE INVENTION

In the process of constructing cabinets and other similar types of furniture case goods, it is usually necessary to bring together and hold in proper angular alignment, all of the associated panels required for the assembly of such items before the fastening of the panels can be achieved. This is traditionally achieved either by positioning and holding the panels in alignment by hand, or by building special jigs or fixtures for holding the components in alignment. In either case, the use of fast-set glues is virtually precluded because of the extremely short working life of this type of adhesive. The ability to use fast-set glues is highly desirable, as it provides a considerable economic advantage over conventional adhesives in terms of increased productivity. There are also other negative aspects associated with the previously mentioned methods.

Hand alignment can be a delicate operation, oftentimes resulting in the need for assistance from another person. Of equal concern is the cost associated with jigs and fixtures, which can be quite significant when a diverse field of products is manufactured in small quantities. Employing special fixtures in the clamping process requires not only the design and construction of the fixtures, but also the maintenance and storage of the same. The time and expense required for such an effort can have a considerable impact on the final cost of a product.

SUMMARY OF THE INVENTION

The first object is to provide a method for holding panels in alignment for gluing, clamping, or otherwise fastening.

The second object is to provide a method for holding panels in alignment without the need of special jigs and fixtures.

The third object is to provide a method for holding panels in the proper angular alignment during the assembly process.

The fourth object is to provide a method for holding panels in alignment that increases the efficiency of an assembly operation.

The fifth object is to provide a method for holding panels in alignment, one joint at a time, thus allowing the use of fast-set glues.

DETAIL DESCRIPTION OF THE INVENTION

Figure 1B:
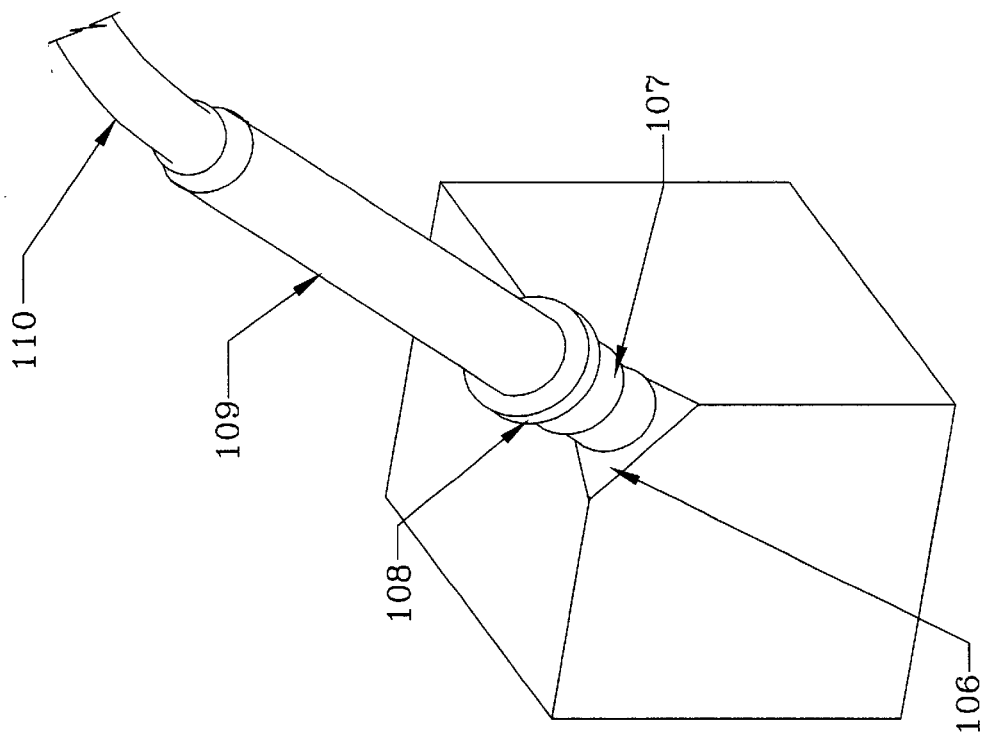
FIG. 1B is a drawing illustration another perspective view of a cubical vacuum activated clamping device.
Figure 1A:
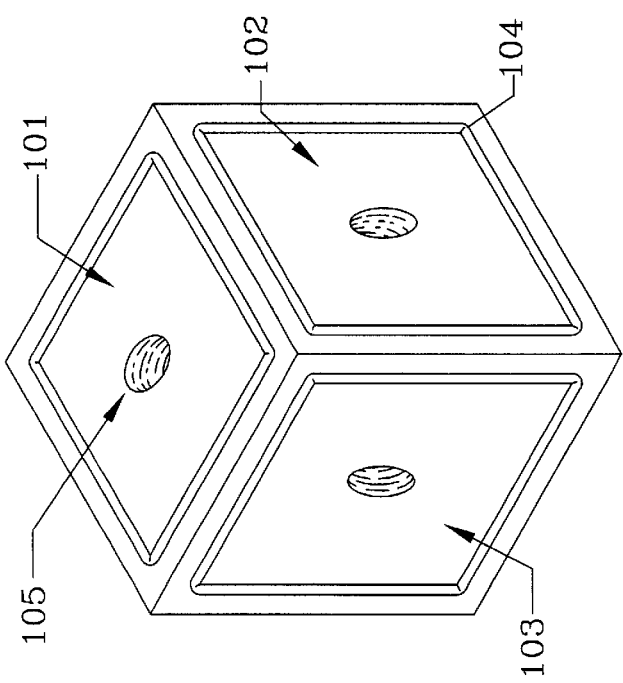
FIG. 1A is a drawing illustrating a perspective view of a cubical vacuum activated clamping device.

Referring to FIG. 1A and FIG. 1B, there are illustrated, 2 perspective views of the embodiment of a vacuum clamping device. The view of FIG. 1A is inverted to show the engaging surfaces of said clamping device. This device is in the shape of a cube. The bottom of the cube 101, along with 2 adjacent, intersecting sides 102 and 103, is fitted with a closed cell foam gasket material 104. Material 104 is recessed into channels that have been milled into the surface of each of sides 102 and 103. The outer perimeter of each milled channel is set in from the perimeter of the side on which said channel is disposed, for example, by approximately three eighths of an inch. A hole 105, is bored from the center of each of the 3 channeled surfaces into the center of the cube where said holes intersect, thus forming a common passage for vacuum.

A corner of the cube 106, is flattened so as to provide a surface, disposed in equiangular alignment with each intersecting side. A hole is bored from the surface of said flattened area to the vacuum passage intersection and is fitted with a valve 107, which is operated by a ring 108, axially disposed in sliding engagement with the body of said valve. A pipe section, for example, approximately 4 inches in length 109, is mounted to the opposite end of the valve and serves as both a handle and a passage for air. A hose 110, connects the opposite end of said pipe section to a vacuum source.

Figure 2:
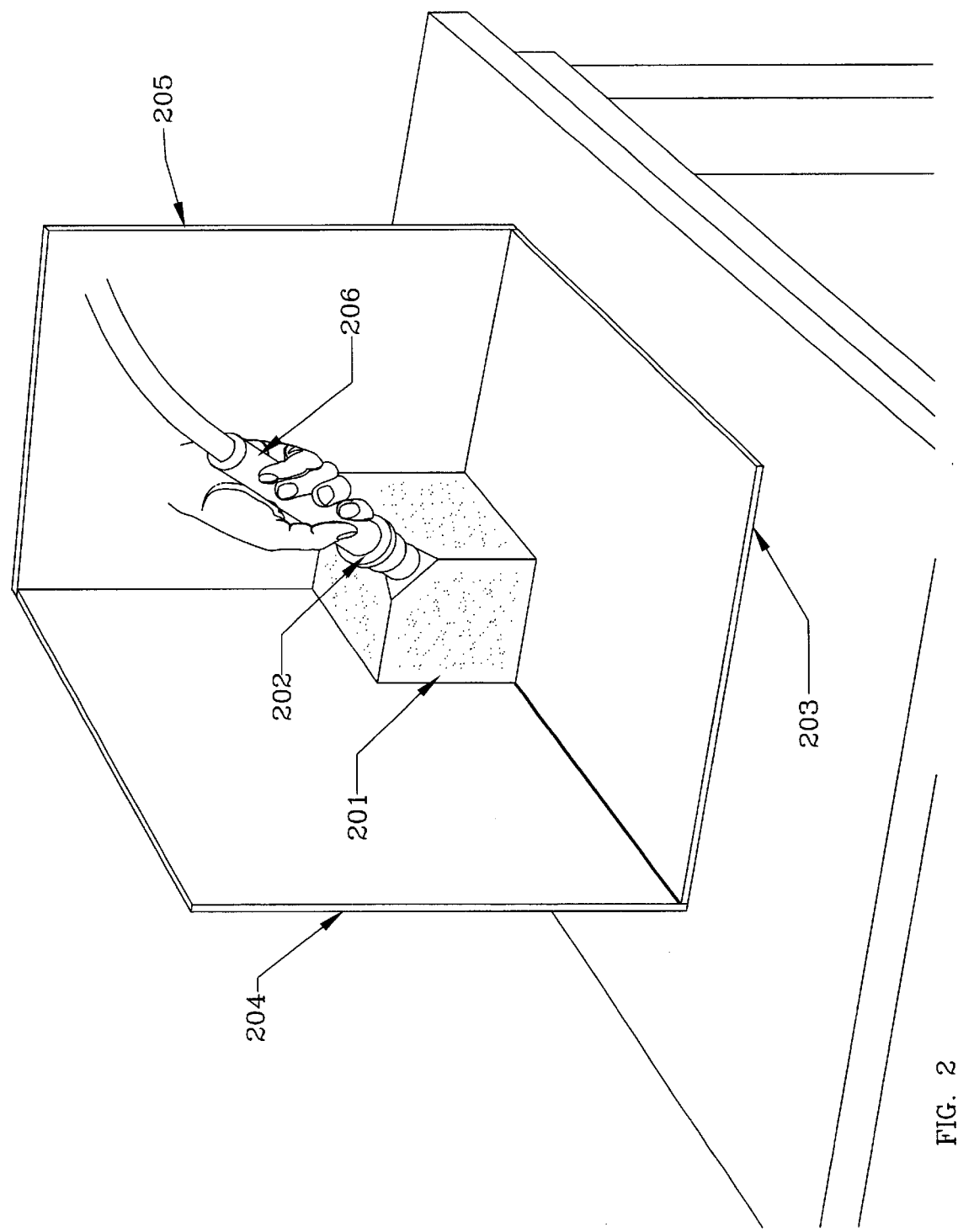
FIG. 2 is a drawing illustrating a perspective view of a cubical vacuum activated clamping device engaged in holding three panels in alignment for assembly.
Figure 3:
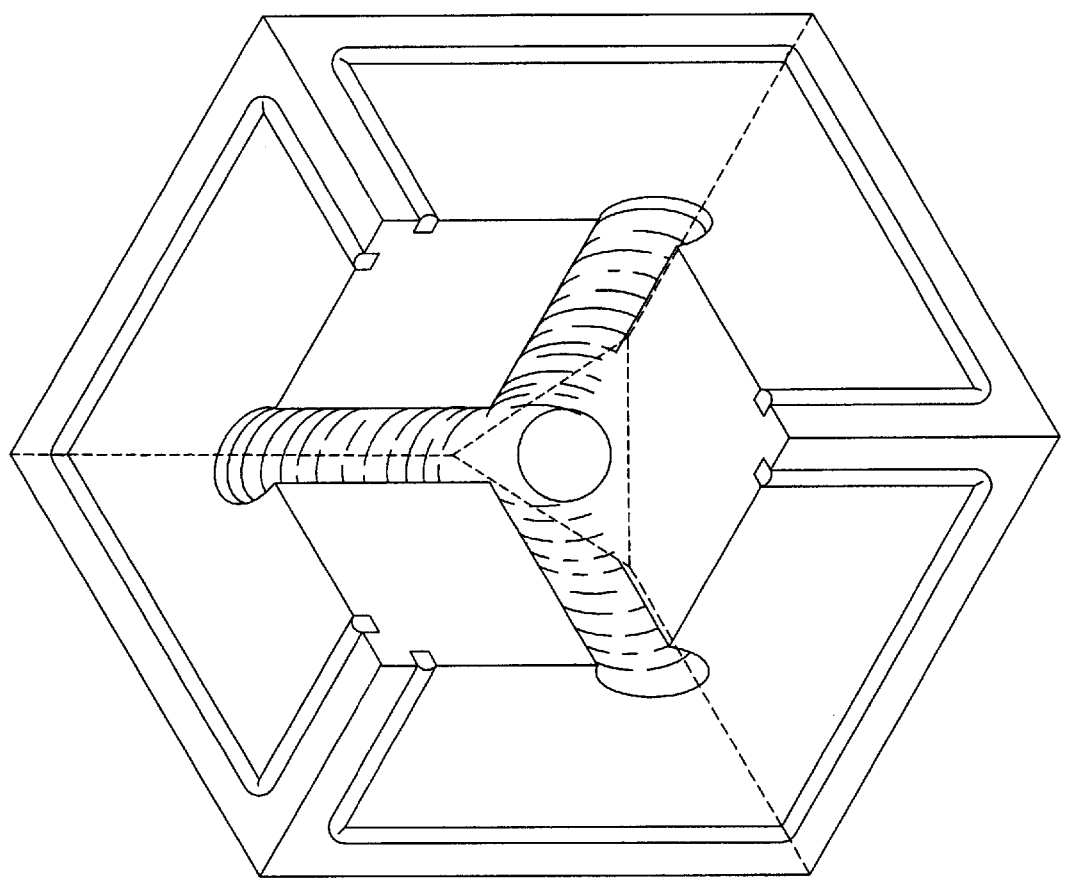
FIG. 3 is a drawing illustrating a perspective sectional view of a cubical vacuum activated clamping device, inverted for illustrative purposes.
Figure 5:
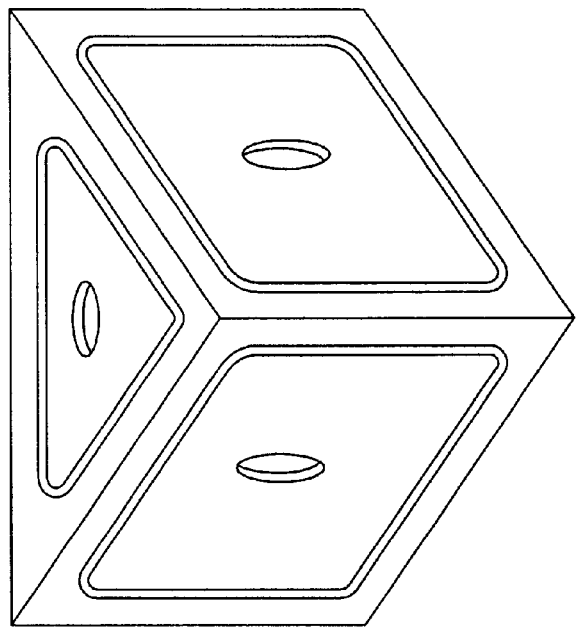
FIG. 5 is a drawing illustrating a perspective view of a triangular vacuum activated clamping device with a hollow interior.
Figure 4:
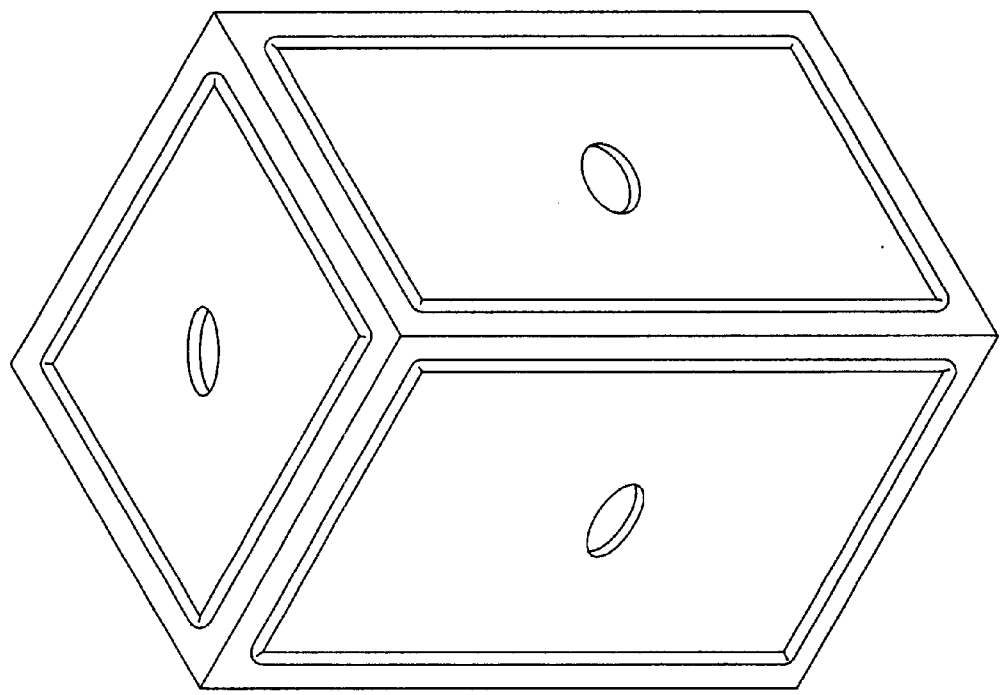
FIG. 4 is a drawing illustrating a perspective view of a cubical vacuum activated clamping device with a hollow interior.
Figure 6:
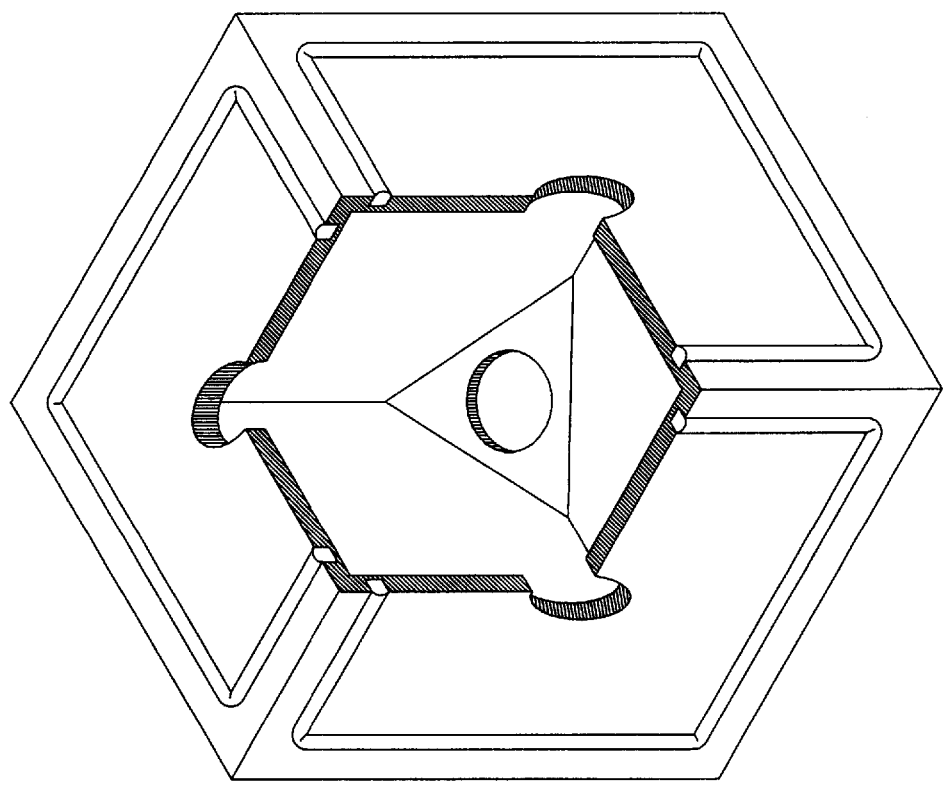
FIG. 6 is a drawing illustrating a broken view of a cubical vacuum activated clamping device with exposing a hollow interior.

FIG. 2 illustrates a partial assembly of an object with intersecting sides. The aforementioned cube 201, is situated with all three gasketed surfaces in engagement with three panels comprising a bottom 203, and 2 adjacent sides 204 and 205, of said object, said gaskets thence forming a seal. When a reasonable state of alignment is achieved, the slide-operated valve 202, is activated, thus venting the inner passages of the cube to vacuum. The valve is of such a design that it may be operated by simply sliding the hand down the handle 206, while still maintaining control over the placement of the cube. When placed in engagement with the surface of all three panels, a seal is formed between the surfaces of the cube and the panels, thus forming a common, sealed chamber. With all gasketed surfaces being sealed, a vacuum is formed within the chamber, thus causing the cube to hold tightly to the surface of each engaged panel. The panels are held in alignment for assembly operations such as gluing or assembling with fasteners. Multiple cubes may be used to aid the complete assembly of an object by a single individual, by placing said cubes in such a manner a may be deemed necessary to facilitate the process. The present invention can be practiced under various shapes, such as a cubical shape, a rectangular shape, a polygonal shape, a tetrahedron shape, an octahedron shape, a truncated prism shape, a parallelepiped shape, a pyramidal shape and a spherical shape, etc. By way of examples, FIG. 4 and FIG. 5 respectively show a cubical shape and a triangular shape. The present invention can also be practiced with a solid substance having carved-out interior flow channels, such as that shown in FIG. 3, or with a shell substance with hollow centers, such as that shown in FIG. 6.

Figure 7:
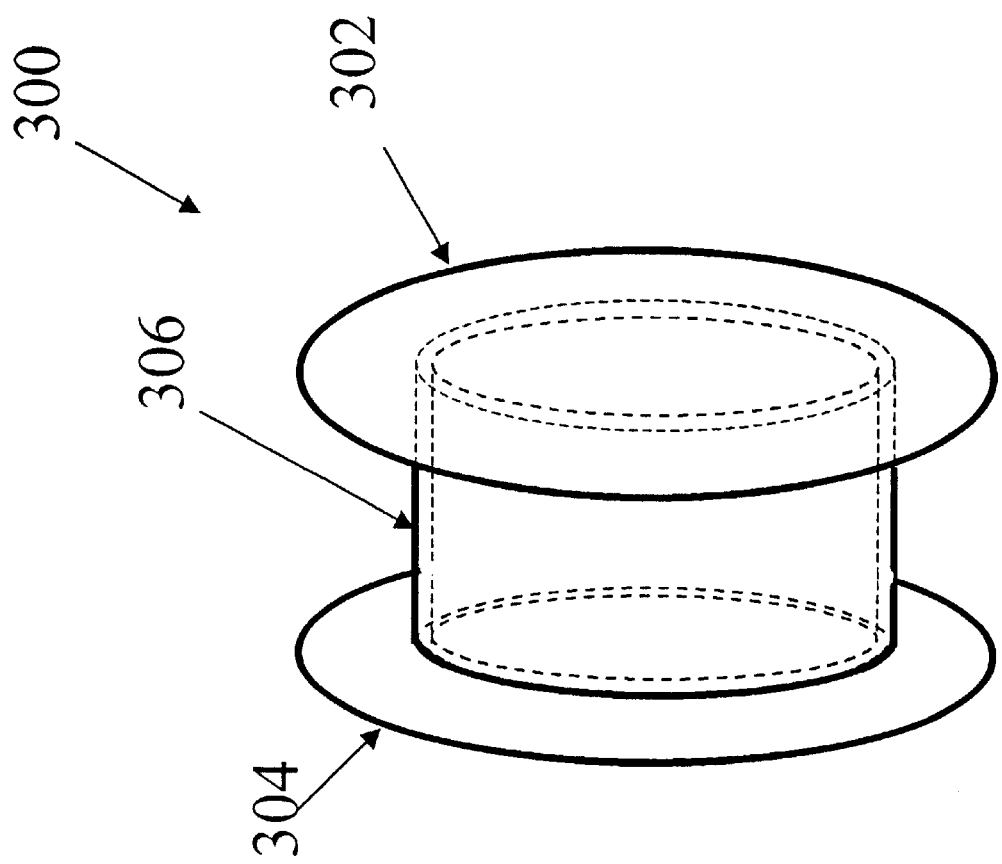
FIG. 7 is a drawing illustrating a ring-sealant of a vacuum activated clamping device.

Surrounding each hole need not always have a separate channel to house a sealing gasket. Instead, a rubber-ring gasket 300 as shown in FIG. 7 can be used. The gasket 300 has a pair of seal rings 302 and 304. Bridging between the pair of seal rings 302 and 304 is a connecting neck 306 having a width same as the thickness of a ring.

Figure 8:
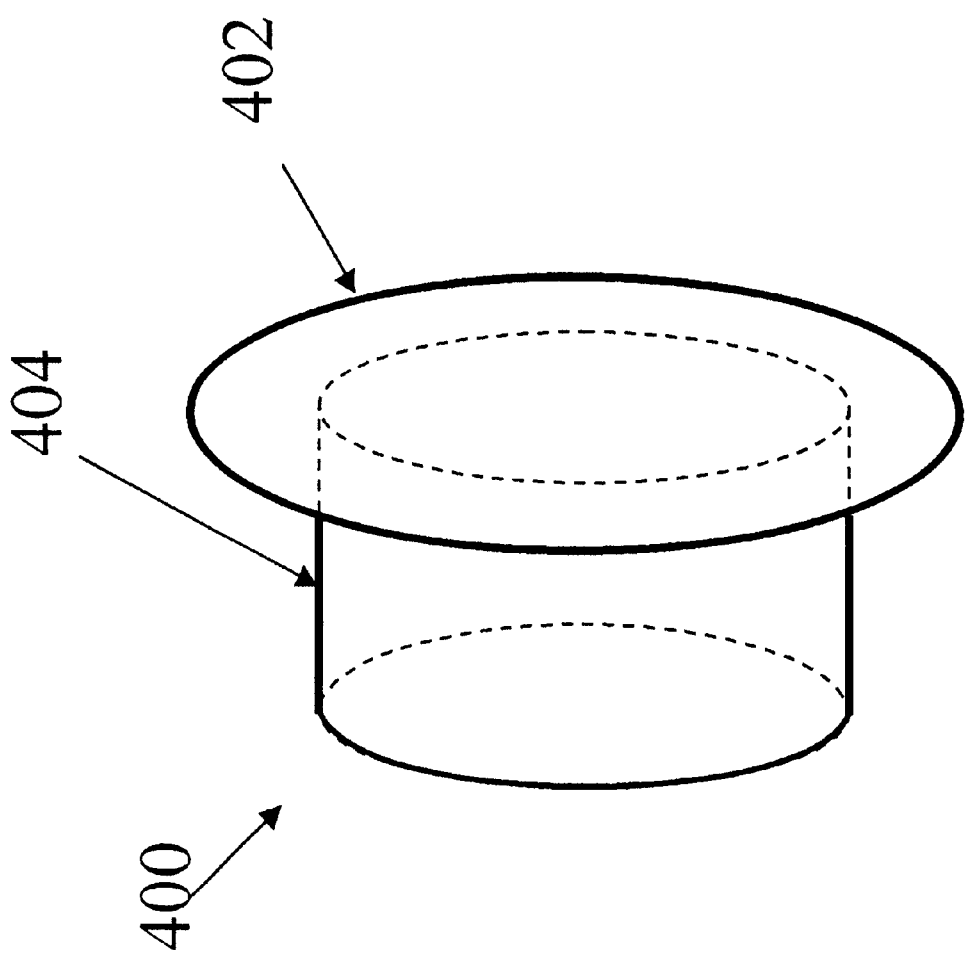
FIG. 8 is a drawing illustrating a stopper of a vacuum activated clamping device.

Even though the present invention has been shown to have four holes on each embodiment, there can be many variations. For example, each surface can have one or a plurality of holes. For each un-use hole, a plug 400 of FIG. 8 can be used as a stopper to prevent transmission of hydraulic forces. The neck 404 is inserted into an opening and the ring seal 402 surrounds the peripheral edge of the opening so as to prevent any leaks between the opening and the plug.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered within the scope thereof as limited solely by the appended claims.

I claim:

1. A holding device, comprising:
    a cube with a plurality of surfaces and having a cavity of space therein;
    a plurality of openings being formed on a predetermined number of the plurality of surfaces;
    wherein when a plurality of panels being placed adjacent to the plurality of openings, and when a hydraulic force being applied to one of the openings, the hydraulic force is being applied to each panel.

2. The holding device of claim 1, wherein the hydraulic force is one of a suctioning force and a pumping force.

3. The holding device of claim 1, wherein at least one of the plurality of openings is a hose receptacle.

4. The holding device of claim 1, wherein one opening is situated on a triangular surface formed by removing one corner of the cube.

5. The holding device of claim 2, wherein all other openings are located on three surfaces furthest distance apart from the triangular surface.

6. The holding device of claim 3, wherein a seal encompassing the opening is placed on each of the three surfaces.

7. The holding device of claim 6, wherein the seal is made of a cell form gasket material.

8. The holding device of claim 5, wherein each of the three surfaces are applied with adhesives so as to permanently retain each of the workpieces.

9. The holding device of claim 1, wherein the cube is a shell.

10. The holding device of claim 1, wherein the cube is a solid with an interior portion being removed to form the cavity of space.

11. The holding device of claim 1, wherein the cavity of space comprises a plurality of channels.

12. The holding device of claim 1, wherein a plug is removeably attachable to each of the plurality of openings.

13. The holding device of claim 1, wherein a seal is removeably attachable to each of the plurality of openings.

14. A device, comprising:
    a body;
    a cavity of space within the body; and
    a plurality of openings being formed on a predetermined number of locations on the body interconnected to the cavity of space;
    wherein a plug is removably attached to each of the plurality of openings.

15. A device, comprising:
    a body;
    a cavity of space within the body; and
    a plurality of openings being formed on a predetermined number of locations on the body interconnected to the cavity of space;
    wherein a seal is installed on: each surface encompassing all openings therein.

16. A device, comprising:
    a body;
    a cavity of space within the body; and
    a plurality of openings being formed on a predetermined number of locations on the body interconnected to the cavity of space;
    wherein a seal is installed on each of the plurality of openings.

17. The device of claim 15, wherein the seal is made of a cell form gasket material.

18. A device, comprising:
    a body having one of a cubical shape, a rectangular shape, a polygonal shape, a tetrahedron shape, an octahedron shape, a truncated prism shape, a parallelepiped shape, a pyramidal shape and a spherical shape;
    a cavity of space within the body; and
    a plurality of openings being formed on a predetermined number of locations on the body interconnected to the cavity of space;
    wherein a corner formed by a number of vertex of various edges of surfaces is removed to form a polygonal surface.

19. The device of claim 18, wherein an opening is formed on the polygonal surface.

20. The device of claim 19, wherein the polygonal surface is a triangular surface.

21. The device of claim 20, wherein the plurality of surfaces is three surfaces farthest distance apart from the triangular surface.

22. The device of claim 14, wherein when a suctioning force is applied to one opening, the suctioning force is transmitted to all other openings.

23. The device of claim 14, wherein when a pumping force is applied to one opening, the pumping force is transmitted to all other openings.

24. The device of claim 15, wherein the seal is an adhesive.

25. A vacuum clamping device comprising:

a cubed shaped embodiment;

a plurality of holes bored from three adjacent surfaces of said embodiment into a common center chamber;

a plurality of channels milled into three adjacent surfaces of said embodiment;

a plurality of gaskets disposed in said channels;

a corner of said embodiment being cut off to form a flat surface, disposed in equiangular alignment with three intersecting sides;

a hole bored through and perpendicular with said flattened surface, into a common center chamber;

a valve attached to said hole, disposed in axially alignment with said hole; and a section of pipe attached to said valve, disposed in axially alignment with said valve.

26. The clamping device of claim 25 wherein said gaskets are of a closed-cell foam material.

27. The clamping device of claim 25 wherein said section of pipe is utilized as the handle for said clamping device.

28. The clamping device of claim 25 wherein said section of pipe is utilized as the handle for said clamping device.

* * * * *

UNITED STATES PATENT AND TRADEMARK OFFICE
CERTIFICATE OF CORRECTION

PATENT NO. : 6,484,783 B1
DATED : November 26, 2002
INVENTOR(S) : Susnjara

It is certified that error appears in the above-identified patent and that said Letters Patent is hereby corrected as shown below:

Column 3,
Line 4, delete "manner a" and insert -- manner as -- in lieu thereof.
Line 60, delete "2" and insert -- 4 -- in lieu thereof.

Column 4,
Line 32, delete "on:" and insert -- on -- in lieu thereof.

Column 6,
Line 2, delete "a common center chamber" and insert -- the common center chamber -- in lieu thereof.

Signed and Sealed this

Third Day of June, 2003

JAMES E. ROGAN
*Director of the United States Patent and Trademark Office*